US008661642B2

(12) United States Patent
Heaton

(10) Patent No.: US 8,661,642 B2
(45) Date of Patent: Mar. 4, 2014

(54) SINK FLANGE RING ALIGNMENT AND INSTALLATION TOOL

(76) Inventor: Kenneth Heaton, Orange, CA (US)

( * ) Notice: Subject to any disclaimer, the term of this patent is extended or adjusted under 35 U.S.C. 154(b) by 552 days.

(21) Appl. No.: 12/932,738

(22) Filed: Mar. 4, 2011

(65) Prior Publication Data

US 2011/0154634 A1 Jun. 30, 2011

Related U.S. Application Data

(63) Continuation of application No. 12/069,047, filed on Feb. 7, 2008, now Pat. No. 7,921,532.

(51) Int. Cl.
*B23P 11/00* (2006.01)

(52) U.S. Cl.
USPC ............................... 29/281.5; 29/270; 29/278

(58) Field of Classification Search
USPC ........ 29/270, 268, 255, 281.5, 271, 256, 266, 29/278; 254/133 R, 134
See application file for complete search history.

(56) References Cited

U.S. PATENT DOCUMENTS

| | | | | |
|---|---|---|---|---|
| 4,411,054 | A * | 10/1983 | Zeilenga | 29/434 |
| 5,177,853 | A * | 1/1993 | Herook | 29/266 |
| 7,024,743 | B2 * | 4/2006 | Heaton | 29/271 |
| 7,140,086 | B2 * | 11/2006 | Heaton | 29/271 |
| 7,185,408 | B1 * | 3/2007 | Keith | 29/229 |
| 7,921,532 | B2 * | 4/2011 | Heaton | 29/270 |
| 2002/0138963 | A1 * | 10/2002 | Ramirez | 29/451 |
| 2003/0192162 | A1 * | 10/2003 | Ramirez | 29/450 |
| 2009/0199382 | A1 * | 8/2009 | Heaton | 29/270 |

* cited by examiner

*Primary Examiner* — Lee D Wilson
(74) *Attorney, Agent, or Firm* — I. Michael Bak-Boychuk

(57) ABSTRACT

A tool for installing a retainer ring onto the lower portion of a loosely inserted drain fitting for engaging a mounting flange thereto includes a generally resilient cup structure provided with a plurality of axially aligned and resiliently cantilevered peripherally adjacent strips within which the retaining ring is received in a compressed engagement seated on a helical interior shoulder. A threaded rod extends through a centering plug received in the drain fitting and then through the cup interior to axially advance the axially aligned ring carried by the strips.

14 Claims, 3 Drawing Sheets

SINK FLANGE RING ALIGNMENT AND INSTALLATION TOOL

REFERENCE TO RELATED APPLICATIONS

This application is a continuation of U.S. patent application Ser. No. 12/069,047 filed on Feb. 7, 2008, now U.S. Pat. No. 7,921,532 and the benefit of this earlier filing date is claimed herein.

BACKGROUND OF THE INVENTION

1. Field of the Invention

The present invention relates to retainer ring installation tools, and more particularly to an installation tool for mounting a retainer ring into an annular groove formed around the exterior of the lower periphery of a sink drain fitting conformed to engage a food refuse disposal device.

2. Description of the Prior Art

The process of replacement and mounting a food refuse macerator, sometimes referred to as a garbage disposal, to the lower drain portions of a kitchen sink entails complex engagement geometries that need to be effected within the very tight and narrow confines of a sink cabinet and is therefore a difficult and cumbersome task. Simply, the disposal is usually a fairly heavy item as it typically requires a robust electrical motor tied to various gearing components, all housed in a sealed enclosure to extend a drive end engaged to the cutting mechanism into a wet cavity that communicates with the sink drain. To simplify the mounting process of this cumbersome equipment piece those sink drain fittings that are intended to support the disposal are typically provided with a lower end that includes an exterior ring groove in which a retainer ring is mounted to support a disposal mounting flange. It is this mounting flange that then includes the typical engagement projections to which the disposal is keyed.

While the currently available disposals that are offered by the several fabricators are typically quite rugged their repeated household use takes its toll nonetheless and the replacement thereof is now a fairly frequent event. Since this eventual replacement is often preceded by fairly long periods of use of a disposal that is operated with some damage the drain fitting itself is often also damaged by repeated periods of asymmetric or unbalanced loads. Good practice therefore requires that the fitting be replaced along with the disposal. Any tool complement that is useful in assisting the disposal installation task should therefore also include the tools for the drain fitting replacement and the in particular, the attachment of the mounting flange thereon.

In the past I have described in U.S. Pat. Nos. 7,024,743 and 7,140,086 an adjustable supporting mechanism on which heavy items like a disposal can be lifted to mate up with the mounting flange, a mechanism that is particularly conformed to the tight dimensions below a sink. By virtue of its adjustment facility this mechanism allows for convenient attachment of the disposal throat to the mounting flange by a single worker. Others, in turn, have devised various forms of hand tools which in one way or another assist in the installation of retaining rings into the ring grooves formed in the lower parts of a sink drain to secure the mounting flange thereon exemplified by the teachings of U.S. Pat. Nos. 7,185,408 to Keith; 5,177,853 to Herook; 4,411,054 to Zeilenga; and U.S. patent application publications 2003/0192162 and 2002/0138963 both by Ramirez.

While the foregoing, and the other, prior art installation tools are each suitable for the purposes intended, it will be appreciated that it is when the sink drain fitting is loose and unsecured in its drain placement that the ring installation is being attempted. Simply, all the ring installation manipulations are in the tight confines of the cabinet below the sink bowl into which the lower part of the drain fitting with the ring groove thereon extends and since the retainer ring is there to secure the mounting flange that also is used to fix the drain fitting to the sink bowl of necessity either two workers are needed, one to hold the fitting to the sink while the other tries to fit the ring from below, or some other mechanism is required to hold the drain fitting while the ring is mounted.

In those prior art instances where an alignment structure is provided for the ring installation process, as in the teachings of the '408, '853 and '054 patents above, the alignment is referenced to the drain fitting that at is then loosely hanging in the sink drain. Alternatively, where there is no referencing structure for the ring expansion tool, as in the Ramirez published applications above, the worker needs to insert both his or her arms into the tight confines below the sink, one arm to hold the lower drain fitting portion while mounting the ring with the other hand. Of course, these tight working conditions preclude any effective control over the drain fitting alignment within the drain opening, disturbing often the sealant bed that is laid around the drain opening and therefore inviting the chances of eventual leakage.

A fixed, base mounted alignment tool that is useful within the narrow confines below a sink to guide the movements of the retainer ring installation, together with an adaptive ring holder structure that is easily controlled by one hand, are therefore extensively desired and it is one such tool that is disclosed herein.

SUMMARY OF THE INVENTION

Accordingly, it is the general purposed and object of the present invention to provide a base mounted alignment tool conformed to extend from below into the interior of a sink drain fitting and to engage the surfaces thereof to provide an advancement reference for a retainer ring carrier onto the lower drain fitting exterior.

Other objects of the invention are to adapt a garbage disposal mounting support assembly for use as an advancement reference for a retainer ring carrier that is advance from below onto the exterior surfaces of a sink drain fitting.

Yet further objects of the invention are to provide a retainer ring installation tool that aligns both a retainer ring carrier and the sink drain fitting onto which the ring is mounted.

Other and additional object will become apparent from the teachings and illustrations that follow below.

Briefly, these and other objects are accomplished within the present invention by providing a generally cup-like holding tool in which the retainer ring is captured in compression between a set of radially spaced axially parallel strips formed by partial cuts in the peripheral surface of the cup from the opening edge towards the cup bottom surface. To achieve this retaining fit the interior radial dimension of the cup opening is slightly less than the free, or unrestrained, dimension of the ring, capturing the ring by the opposing outward resilient flexure of the partly severed strips of its peripheral wall. Preferably, the cup is formed of a resilient polymeric material structure with the width and cantilever length of the parallel strips being selected to allows for some flexure thereof when holding the ring.

To accommodate convenient insertion of the retainer ring into its captured location between the peripherally spaced strips and to assist in clearing any interfering projection during the installation thereof onto the lower drain fitting end a chamfer is cut on both the outer and inner edges of the free strip ends that also constitute the edge opening of the cup. Additionally, a helical shoulder is provided below the inner chamfer within the interior cup wall, spread across the interior wall segments of each strip, to form a ring seat that limits any further axial displacement of the captured ring, with the axially spaced ends of the shoulder terminating at a common separation between two adjacent strips.

In this form the inventive ring installation tool can be mounted onto a threaded shaft extending through an annular opening in the bottom surface of the cup with the upper free end of the shaft aligned to extend beyond the free edges of the strips for insertion from below into the drain fitting to emerge within the sink bowl. A threaded plug conforming to the sink drain fitting is then mounted onto the exposed upper end of the threaded shaft to provide a centering alignment therein and to advance the cup opening with the retainer ring captured on the helical shoulder therein over the lower drain fitting surfaces that define the ring seat.

To further increase the convenience of ring installation this combination of the ring capturing cup mounted on the threaded shaft and aligned within the drain fitting by the centering plug may be mounted in a mount assembly similar to that described in my prior U.S. Pat. Nos. 7,024,743 and 7,140,086. Once supported in the mount assembly the above combination may be first lifted into a preliminary alignment with the drain fitting by the adjustment therein and thereafter axially advanced to pull the ring into its seat by the threaded advancement of the plug. In this particular combination the restraint against rotation of the threaded shaft that I have earlier provided in the mount assembly is particularly useful in bringing the ring home into its seat since such is effected without restraining axial displacement of the shaft.

Accordingly, by this inventive combination all the necessary functions entailed in the mounting and/or replacing a disposal are synergistically combined in a single assembly. The dreaded aspects of this unpleasant, highly constrained and therefore difficult task are thus virtually eliminated.

DESCRIPTION OF THE PREFERRED EMBODIMENTS

Figure 1:
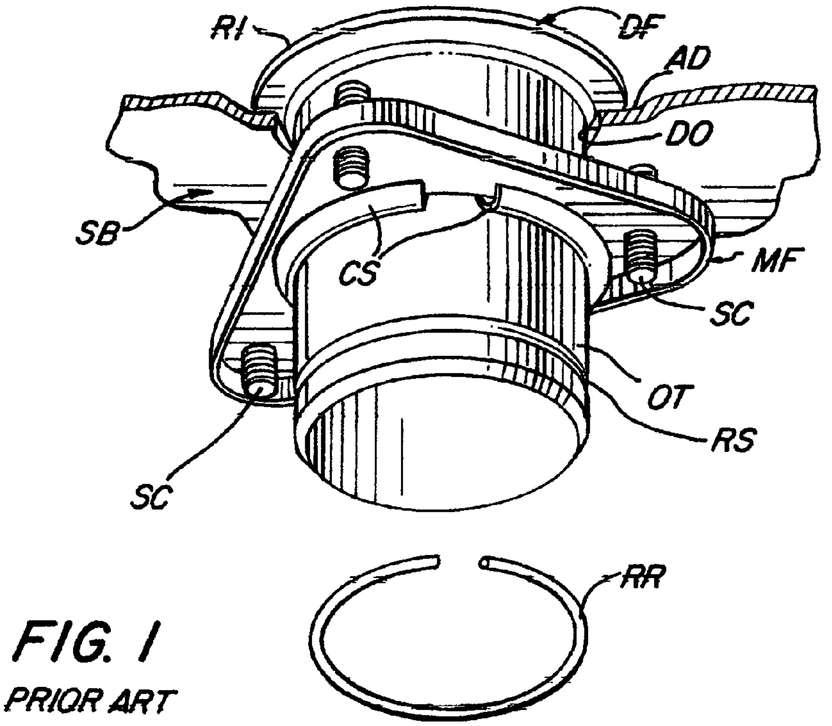
FIG. 1 PRIOR ART
FIG. 1 is a perspective view, in partial section, of a conventional disposal mounting flange retained by the installed ring on the lower exterior surfaces of the sink drain fitting.

The mounting connection of a disposal to the lower end of a drain fitting has gone through its evolution and is now implemented in a structure that is pretty much standardized and is therefore illustrated in FIG. 1 as the background prior art. To adapt this mounting structure to the drain opening DO of a sink basin SB the rim RI of a specialized drain fitting DF is bedded in the annular depression AD usually formed around the drain opening with the outlet tube OT of the drain fitting then passing through the drain opening into the space below the sink basin.

To serve as an attachment structure the exposed exterior periphery of the outlet tube OT is provided with a ring seat or groove RS into which a retainer ring RR is fitted after an annular mounting flange MF is first positioned on the outlet tube, thus capturing the flange to the drain fitting by the interfering projection of the excess ring thickness that extends beyond the ring seat RS. This loosely captured arrangement is then tightened in its engagement to the sink basin by the threaded advancement against the underside of the sink of a set of screws SC extending through the mounting flange MF. Once thus fixed a set of cam surfaces CS on the underside of the mounting flange MF is then useful to engage mating surfaces in the disposal that is to be mounted thereon As earlier noted, it is this process of manipulating the retainer ring RR into its groove within the tight confines below the sink while the whole drain attachment ensemble is loose that has heretofore presented some of the larger difficulties in the whole installation process and for that reason replacement of the old, worn out drain fitting has been often simply omitted. Set out, therefore, below is an inventive ring installation tool that is specifically directed to simplify this cumbersome process.

Figure 4:
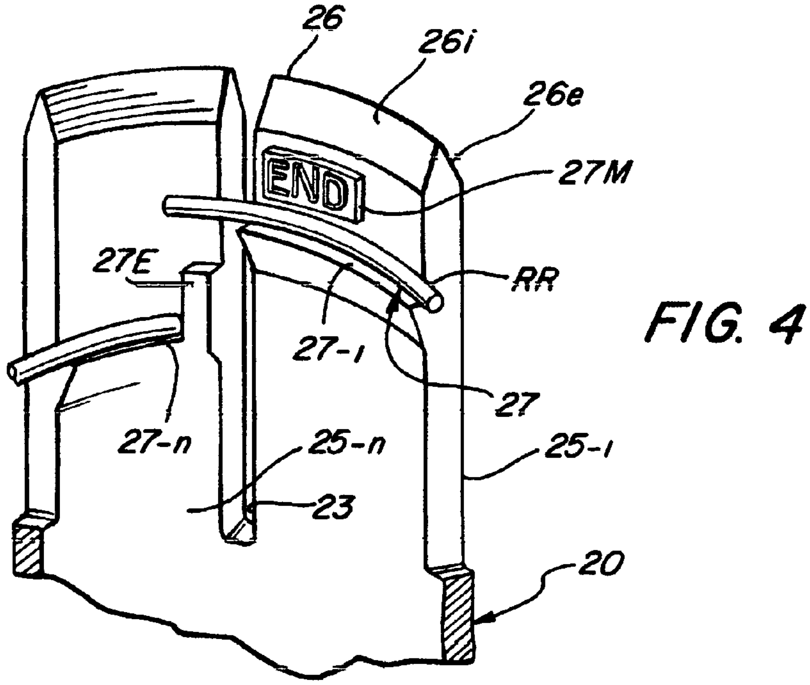
FIG. 4 is a perspective detail view of a portion of the inventive ring holding assembly conformed to receive the ends of the ring.
Figure 2:
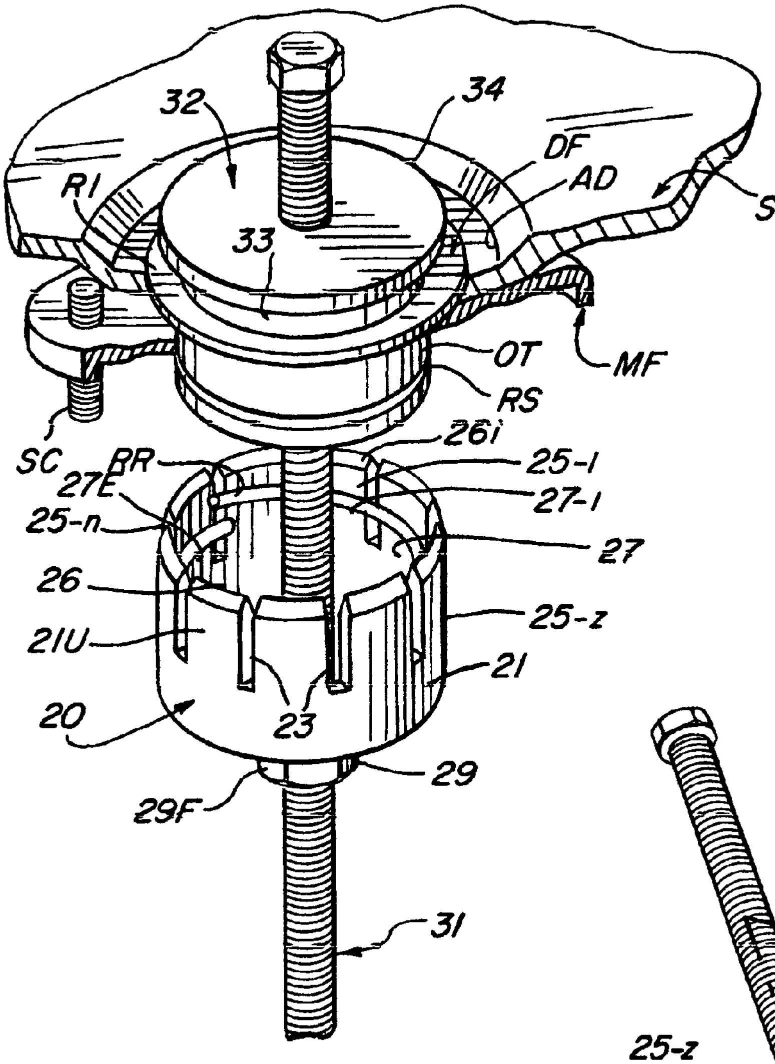
FIG. 2 is a perspective illustration of the inventive retainer ring holding assembly received in an aligning engagement within the interior of a sink drain fitting.
Figure 3:
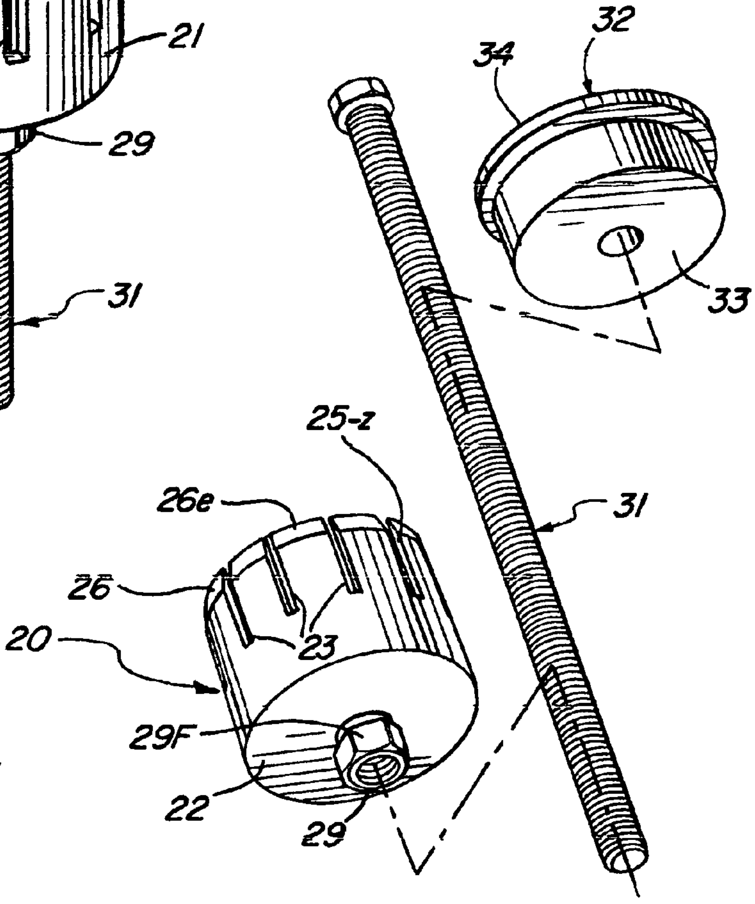
FIG. 3 is yet another perspective illustration, separated by parts, of the inventive ring holding assembly in position for receipt in a sink drain fitting.

By reference to FIGS. 2 through 4, the inventive ring installation tool, generally designated by the numeral 10, includes a cup shaped ring holder 20 defined by a peripheral tubular segment or wall 21 closed at its lower axial end by a circular bottom plate 22. At the other end wall 21 is separated into a plurality of adjacently aligned strips 25-1 through **25-*n* that together form the cup opening, extending from the free edge 26 partly through the wall height as a set of adjacently aligned and spaced cantilevered fingers or extensions formed by axially oriented separation cuts 23 in the upper wall segment 21**U that is dimensioned to form an annular space that is smaller than the unconstrained radial dimension of the retainer ring RR.

Preferably cup 20 is formed of a resilient polymeric structure like Nylon, ABS or PVC and the respective strips 25-1 through **25-*n* are therefore susceptible to flexure in cantilever. Moreover, to accommodate the receipt of the retainer ring RR in the annular opening between the ends of strips 25-1-25-*n* each of the free edges thereof that define the cup edge 26 is faired in thickness along an interior chamfer 26*i*. Similarly, to accommodate the insertion of the installation tool 10 across various external projections below the sink the same free edges of strips 25-1 through 25-*n* defining the cup edge 26 are faired by an exterior chamfer 26*e***. This faired shape together with the flexure accommodation allow for some misalignment of the tool in the course of the ring installation.

To further assist in the installation of the retainer ring RR the interior surfaces of strips 25-1 through **25-*n* include formed thereon a helical ledge or shoulder 27 distributed in corresponding segments 27-1 through 27-*n* along a single right-handed helical turn. Shoulder 27 is somewhat less in projecting thickness than the thickness of ring RR and thus provides a restraint against any further inward translation of the ring towards the base 22 while also deploying one ring end axially ahead of the other to find capture within the ring seat RS Once thus partly engaged further ring seating can be simply effected by rotating and/or axially advancing cup 20**.

In this form the cup 20 is mounted on a shaft 31 extending its lower portion through the cup interior through an annulus 22A in the bottom surface 22 supported on the shaft by a nut 29. At its upper portion shaft 31 extends through fitting DF and then by threaded receipt in a circular plug 32 defined by a lower body 33 conformed for intimate fit in the outlet tube OT and capped by a larger shoulder 34 that rests on rim RI. In this form the assembled tool 10 is both centered and supported within the drain fitting as the cup 20 carrying ring RR on the helical shoulder 27 is advanced from below onto the exterior surface of the outlet tube to seat the ring in the ring groove RS.

To render the foregoing ring advancement convenient the exterior surface of nut 29 may be provided with hexagonal flats 29F which can then be engaged by any convention wrench. Moreover, strip 25-1 that carries the most forward shoulder segment 27-1 may be marked with a visual indicator 27M to indicated to the user where one of the ring ends is to be located while the last strip 25-*n* includes an end stop projection 27E in its shoulder segment 27-*n* to oppose the other ring end. In this manner a combined shoulder length limitation is established which results in an unsupported projection of one end of the ring RR that extends beyond the shoulder segment 27-1 as result of the confining radial dimension between the respective fingers.

It will be appreciated by those skilled in the art that the positioning of the ring onto the smaller diameter shoulder 27 results in an elastic equilibrium between the resilient confining restraint of the fingers and the outwardly biased spring forces in the ring which result in a circumferential excess in the form of a projecting ring end. It is this ring end that is then first available for capture in ring groove RS to start the whole ring seating process in which the newly equilibrated radial dimension of the ring is expanded by the outward forces generated when the strips 25-1 through 25-*n* with the ring mounted therein are spread as they are advanced onto the exterior of outlet tube OT.

While the foregoing installation tool 10 is useful in the form described above its convenience may be further improved by combining its functions with the functions of the adjustable mount assembly that I have earlier described in the prior U.S. Pat. Nos. 7,024,743 and 7,140,086 issued to me earlier and which I incorporate herein by reference. The mount assembly that I have described in the foregoing patents is particularly useful to support a heavy and cumbersome disposal as it is engaged to the mounting flange MF.

Figure 5:
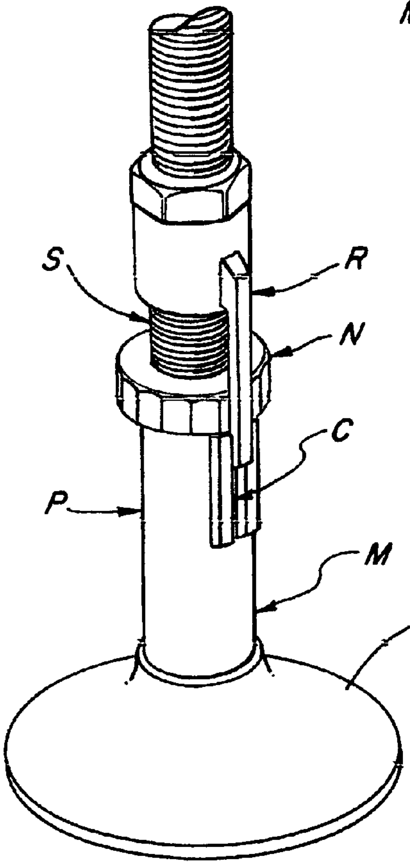
FIG. 5 PRIOR ART
FIG. 5 is a further perspective illustration of a prior art mount assembly useful in installing a disposal substantially similar to that described in my prior U.S. Pat. Nos. 7,024,743 and 7,140,086.

Without limiting in any manner the full scope of the teachings in my earlier US patents, and by particular reference to FIG. 5 herein which in substance conforms to the relevant details described in FIG. 2 of both the '743 and '086 patents, my earlier mount assembly M is supported on a base B into which one end of a vertical pipe segment P is threaded. The lower end of a threaded shaft S with an adjustment nut N mounted thereon is then inserted into the vertical pipe segment P and a rotary restraint R clamped to the shaft S above nut N and engaging a channel C below it then allows the manual turning of the adjustment nut N without rotating the whole assembly.

Figure 6:
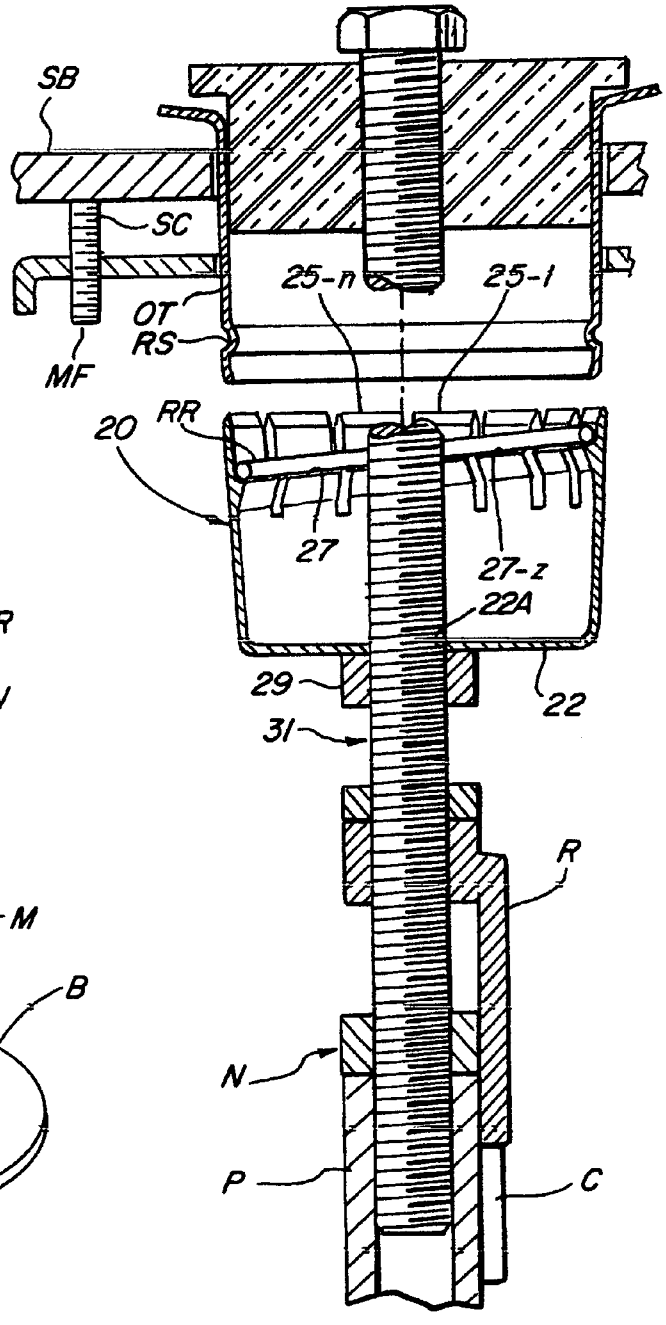
FIG. 6 is a side view, in section, of the prior art mount assembly shown in FIG. 5 modified to support the inventive ring holding assembly in the course of the installation of a retaining ring.

By particular reference to the sectional illustration in FIG. 6 it will be appreciated that the threaded shaft S of my previously disclosed structure can be replaced by the threaded shaft 31 disclosed herein to obtain an adjustable combination in which the mount assembly M supports the inventive ring installation tool 10 in the course of its use as described above. In this particular arrangement the manual turning of the adjustment nut N may be used to raise cup 20 with the retainer ring RR supported on the shoulder 27 therein onto the outlet tube OT until the ring snaps into is ring groove RS. One thus engaged the screws SC in the mounting flange can be advanced to fix the whole drain fitting assembly to the sink basin.

In this manner all the tooling that is necessary to render the installation of a disposal convenient interchangeably shares common components, reducing their cost while also reducing the need for assistants in the course of use thereof. All these and the many other advantages are obtained in a structure that is simple to fabricate and is therefore both rugged and reliable.

Obviously many modifications and variations of the instant invention can be effected without departing from the spirit of the teachings herein. It is therefore intended that the scope of the invention be determined solely by the claims appended hereto.

It is claimed:

1. A tool useful for aligning a split retainer ring for receipt in an exterior ring groove, comprising:

a generally tubular segment defined by a peripheral wall enclosing an interior opening dimensioned to radially compress said retainer ring upon the generally transverse receipt thereof within said opening, a first portion of said peripheral wall including a plurality of spaced separations extending generally parallel to the central axis of said segment defining a corresponding plurality of partial wall strips extending in cantilever from the remaining second portion thereof; and an interiorly directed helical support shoulder formed in generally contiguous increments distributed over the corresponding inner surfaces of said strips for opposing the axial translation of said ring within the interior opening.

2. A tool according to claim 1, further comprising:

a bottom plate extending across said second portion of tubular segment at the free edge of said peripheral wall.

3. A tool according to claim 2, wherein:

said bottom plate includes an annulus formed therein.

4. A tool according to claim 3, wherein:

said tubular segment comprises a resilient polymeric material structure.

5. A tool according to claim 1, wherein:

said helical support shoulder extends over less than a full circumference of said interior opening.

6. A tool according to claim 5, wherein:

said tubular segment comprises a resilient polymeric material structure.

7. A tool according to claim 6, wherein:

said tubular segment comprises a resilient polymeric material structure.

8. A tool according to claim 7, wherein:

said bottom plate includes an annulus formed therein.

9. An installation tool useful in installing a retainer ring into the ring groove of a drain fitting, comprising in combination:

a generally tubular segment formed of a resilient polymeric material and defined by a tubular peripheral wall having a transverse upper edge and a transverse lower edge generally parallel to said upper edge forming a peripheral surface enclosing an interior cavity dimensioned to compress said retainer ring upon the receipt thereof within said cavity, said peripheral wall including a plurality of spaced separations extending from said upper edge and extending over an upper portion of said wall to form a corresponding plurality of intermediate partial wall strips therebetween extending in cantilever from the remaining lower portion of said wall; and a generally helical support shoulder formed in substantially contiguous increments formed on the corresponding inner surfaces of a plurality of said wall strips for providing a support for said ring in the course of the axial advancement of said upper edge over said drain fitting, whereby said advancement is accompanied by an outward flexure of said cantilevered strips to allow the expansion of said ring supported on said helical shoulder.

10. An installation tool according to claim 9, further comprising:

a bottom plate extending across said tubular segment from said lower edge of said peripheral wall including an annulus formed therein.

11. An installation tool according to claim 10, further comprising:

a threaded shaft extending through said annulus and through said interior cavity within said segment and conformed to extend through said drain fitting.

12. A ring installation tool for installing a retainer ring into the ring groove, comprising in combination:

a generally tubular segment formed of a resilient polymeric material and defined by a peripheral wall having an upper edge and a lower edge substantially parallel to said upper edge forming a circular peripheral surface dimensioned to compress said retainer ring upon the inserted receipt thereof within said segment, said peripheral wall including a plurality of spaced separations extending from said upper edge partly therethrough to form a corresponding plurality of intermediate partial wall strips extending in cantilever from the remaining portion of said wall;

a generally helical support shoulder formed in contiguous increments on the interior of a plurality of said wall strips for providing a support for said ring in the course of the axial advancement of said upper edge over said drain fitting, whereby said advancement is accompanied by an outward flexure of said cantilevered strips to allow the expansion of said ring supported on said helical shoulder; and a bottom plate extending across said lower edge of said tubular segment including an annular opening formed therein.

13. A ring installation tool according to claim 12, further comprising a threaded shaft extending through said annulus and through said segment and conformed to extend into said drain fitting.

14. An installation tool according to claim 10, further comprising:

a mount conformed for receiving in a vertical alignment one end of said threaded shaft and including adjustment means for adjusting the vertical receipt dimension of said shaft therein.

* * * * *